United States Patent
Leavitt et al.

(10) Patent No.: US 12,008,127 B2
(45) Date of Patent: *Jun. 11, 2024

(54) RULE SET-BASED AUTHORIZATION FOR DATA POOL

(71) Applicant: RateGain Adara, Inc., Dallas, TX (US)

(72) Inventors: Michael Baird Leavitt, Belmont, CA (US); Chinmay Vikram Gandhi, San Jose, CA (US); Hongcheng Mi, Belmont, CA (US); Yuan Gao, Foster City, CA (US); Shuo Yang, Milpitas, CA (US); Dylan Tao-Pei Su, San Jose, CA (US); Julius Quinoveva Quiaot, Fremont, CA (US); Jian An, Union City, CA (US); Xiaozhou Fang, Apex, NC (US); Melissa Beth Stein, San Mateo, CA (US)

(73) Assignee: RATEGAIN ADARA, INC., Dallas, TX (US)

( * ) Notice: Subject to any disclaimer, the term of this patent is extended or adjusted under 35 U.S.C. 154(b) by 322 days.

This patent is subject to a terminal disclaimer.

(21) Appl. No.: 17/487,931

(22) Filed: Sep. 28, 2021

(65) Prior Publication Data

US 2022/0027495 A1 Jan. 27, 2022

Related U.S. Application Data

(63) Continuation of application No. 16/001,913, filed on Jun. 6, 2018, now Pat. No. 11,132,455.

(51) Int. Cl.
G06F 21/62 (2013.01)
G06F 16/2455 (2019.01)
G06F 21/60 (2013.01)

(52) U.S. Cl.
CPC .... *G06F 21/6218* (2013.01); *G06F 16/24564* (2019.01); *G06F 21/604* (2013.01)

(58) Field of Classification Search
CPC . G06F 16/24564–24566; G06F 21/604; G06F 21/62; G06F 21/6218–6281;
(Continued)

(56) References Cited

U.S. PATENT DOCUMENTS 6,202,066 B1 3/2001 Barkley
10,824,747 B1 11/2020 Magerkurth
(Continued)

*Primary Examiner* — Kevin Bechtel
(74) *Attorney, Agent, or Firm* — Jackson Walker LLP; Christopher J. Rourk; Daniel D. Smith

(57) ABSTRACT

Techniques are described for pooling data originating from different entities into a data pool managed by a data pool management system for performing accurate and resource-efficient statistical and other data operations by entities. Techniques further include maintaining rule sets that govern access to the data sets of the data pool. The DPMS uses the rule sets to determine whether a particular data set, on which a particular operation is requested to be performed, qualifies as authorized data for the requesting entity. In an embodiment, the DPMS determines, based on one rule set, that the particular data set does not qualify as authorized data for the particular operation. The DPMS further determines that based on another rule set the particular data set does qualify as authorized data for the particular operation. Based on determining that authorizing rule set overrides the non-authorizing rule set, DPMS proceeds to performing the particular operation using the particular data set.

20 Claims, 5 Drawing Sheets

(58) Field of Classification Search
CPC ..... G06F 2221/2113; G06F 2221/2141; H04L 63/10–105; H04L 63/20–205
See application file for complete search history.

(56) References Cited

U.S. PATENT DOCUMENTS

| | | | |
|---|---|---|---|
| 2015/0199533 A1* | 7/2015 | Chou Fritz | ......... G06F 21/6218 |
| | | | 715/781 |
| 2018/0227119 A1 | 8/2018 | Bibera | |
| 2019/0180039 A1 | 6/2019 | Considine | |
| 2019/0229890 A1 | 7/2019 | Brehmer | |
| 2019/0319939 A1 | 10/2019 | Hamel | |
| 2019/0384932 A1 | 12/2019 | Pratt | |
| 2020/0089671 A1 | 3/2020 | Padmanabhan | |
| 2020/0374125 A1 | 11/2020 | Guillama | |
| 2021/0075623 A1 | 3/2021 | Petersen | |
| 2022/0019686 A1 | 1/2022 | Mi et al. | |

* cited by examiner

RULE SET-BASED AUTHORIZATION FOR DATA POOL

BENEFIT CLAIM

This application claims the benefit under 35 U.S.C. § 120 as a Continuation of application Ser. No. 16/001,913, filed Jun. 6, 2018, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE INVENTION

The general technical field of the present disclosure is computer software programmed computers in distributed systems. The technical field of the disclosure relates more specifically to rule set-based authorization for operation(s) on a data pool.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Increasingly, the amount of data becomes very critical in accurate determination of data representations. For example, a data representation related to predicting a likelihood of a consumption of an item by a user is determined by data related to previous consumption of this item or related items. The more data points exist for the previous consumption, the more accurate is the determination. Although multiple computational methodologies exist for determining such data representations, the accuracy of these methodologies is still highly dependent on the amount of data rather than the methodologies used.

Not all entities that desire to compute an accurate data representation have enough of their own data collected to ensure accuracy. In some cases, such entities have no data of their own at all. Without any data, no accurate prediction is possible, while using lesser amount of data makes the data representation less accurate.

Additionally, the quality of data is also a major factor in an accurate determination of a data representation. The context in which the data is collected, the attributes of data and the completeness of the data can have major effect on the accuracy of data representations derived from the data. Thus, it is not advisable for an entity with shortage of data to simply complement its own data with any available source. Those sources and the data available from those sources need to be carefully selected.

Another challenge in obtaining more data is the complex relationship among entities originating the data. Specific relationships may prevent entities from data sharing. For example, while arguably the best quality data is obtained from a competitor entity, the competitor entity most likely would not authorize such data transfer, Similarly, regulations (such as privacy laws) that govern specific industries may place restrictions on entities for type of data to be shared or even prevent sharing completely.

Without quantity and quality data, computed data representation is unreliable. The computing resources spent on computing such a representation may be entirely wasted. Additionally, if further computing resources are deployed for computations that are based on the unreliable representation, those computing resources are even further wasted. For example, if a machine learning model is trained with an inadequate quantity/quality data, the computing resources used in both the training and further calculation of an outcome based on the model would be misused. Such machine learning environments are initiated on demand, and the initiation itself is a fixed and repeated computational cost. The cost should be avoided if there is insufficient data for either quality or quantity reasons.

DETAILED DESCRIPTION

Figure 1:
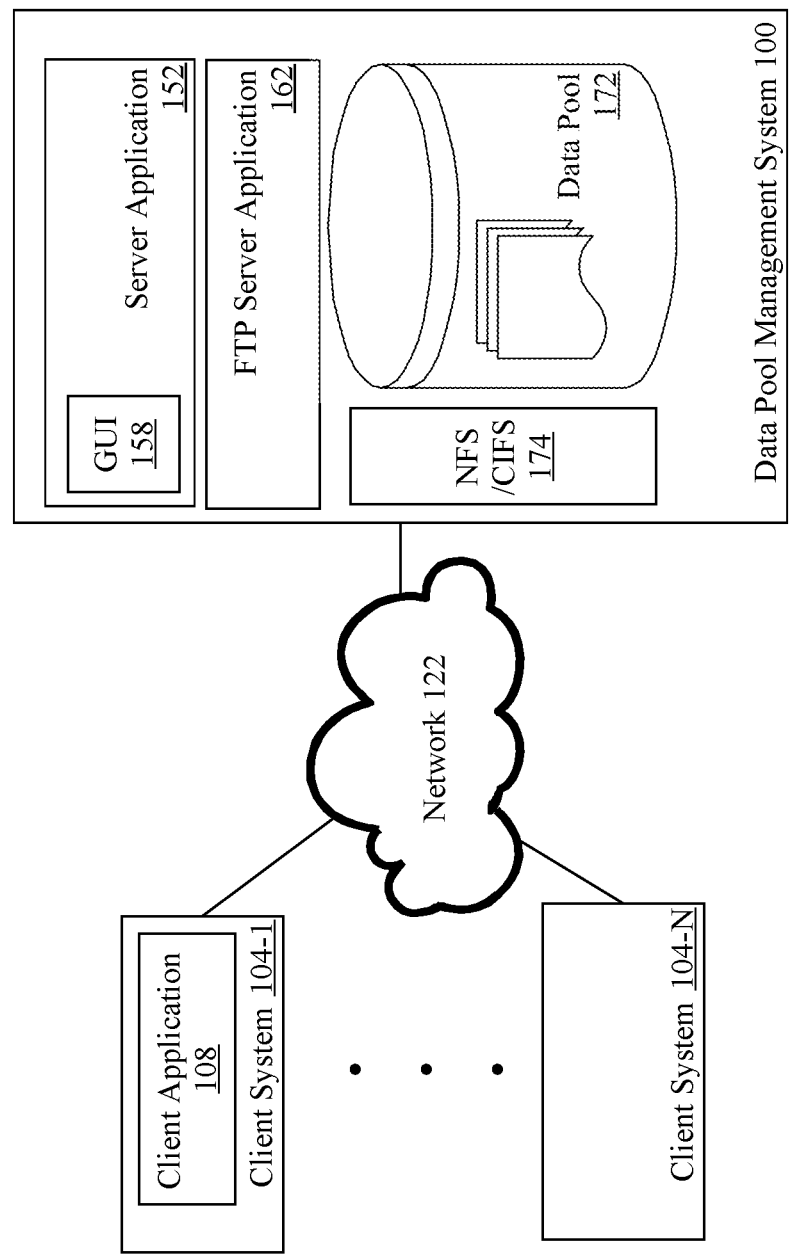
FIG. 1 is a block diagram that depicts a data pool management system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To alleviate the lack of data for an entity and at the same time, improve computational efficiency for computing data representation(s), a "data pool" is used. The term "data pool" refers herein to a collection of data that originated from multiple entities. Each data set of data pool is associated with an entity, which itself may represent a group of entities, in an embodiment.

Because a data pool stores data sets that have been received from multiple originating entities and multiple other entities may request operations on data sets in the data pool, the data pool management system (DPMS) implements techniques to control access to the data pool. Without a DPMS managed security, the originating entities would be reluctant to share their respective data set(s) using the data pool. Accordingly, using techniques described herein, the DPMS provides authorization mechanism to ensure that other entities that use the data pool access a received data set from an originating entity based at least on access rules of the originating entity.

In an embodiment, along with a data set, the DPMS receives one or more attributes for generating rule set(s) for authorizing access to the received data set. The DPMS processes a received data set and to improve data security and privacy, generates one or more rule sets that govern access. Non-limiting examples of rule sets include an entity-level rule set, which is defined by the originating entity, a group-level rule set which is defined by the group of which the originating entity is a member, and/or a system-level rule set which is defined by the DPMS managing the data pool of the data set, according to one approach.

In one embodiment, a system-level rule set is defined for a requesting entity. In such an embodiment, as part of the system-level rule set, a DPMS designates a requesting entity(s) to be granted and/or denied access to one or more data set(s) of the data pool managed by the DPMS. The designation of the requesting entities and/or the selection of the one or more data sets may be indicated in one or more user inputs received by the DPMS. Alternatively or additionally, the designation or the selection may be based on one or more criteria. For example, a criterion may denote a requesting entity having a membership in a particular group, a requesting entity having a particular attribute/attribute value or data set's metadata having a particular attribute/attribute value.

In an embodiment, multiple rule sets that govern the access to a data set, have a hierarchical relationship which is used to determine the access to the data set. The term "higher-tier rule set" refers herein to a rule set that applies to data set(s) of a greater group of originating entities than another rule set also associated with the data set(s). Similarly, the term "lower-tier rule set" refers herein to a rule set that applies to data set(s) of a lesser group of originating entities than another rule set also associated with the data set(s). A lower-tiered rule set in a hierarchy overrides and permits the access prohibited by a higher-tiered rule set, or a lower-tiered rule set in a hierarchy overrides and prohibits the access permitted by a higher-tiered rule set, in one embodiment. Alternatively, a higher-tiered rule set in a hierarchy overrides and permits the access prohibited by a lower-tiered rule set, or a higher-tiered rule set in a hierarchy overrides and prohibits the access permitted by a lower-tiered rule set. As one example, a system-level rule set for a data set is a higher-tier rule set than an entity-level rule set for the data set, while a group-level rule set for the data set is a lower-tier rule set than the system-level rule set.

In an embodiment, when an entity requests an access to a data set to perform one or more operations, the rule set(s) associated with the data set are determined and are applied according to the hierarchy. The application of rule set(s) causes a DPMS to make a determination whether the data set qualifies as an authorized data set for the requesting entity.

In an embodiment, the rule set(s) associated with the data set is stored on a distributed system of computing nodes, in which each node storing a particular rule set may participate in application thereof on the data set. The determination of the application is made on the bases of congruency and equality of the nodes in the distributed system. For example, if the majority of the nodes apply the rule set to authorize an access to the data set, then the data set qualifies as authorized data set.

One or more operations on one or more data sets can yield a data representation, in an embodiment. To improve the utilization of computing resources, the computed data representations are re-used by multiple entities, according to approaches described herein. Once a data representation is computed by performing one or more operation on one or more data sets, the data representation is stored within the DPMS (such as in the data pool) and can be accessed by an entity requesting the same data representation. Thus, the DPMS has no need to re-execute operations to compute the data representation, considerably improving the performance of the DPMS by saving computing resources that would have been used in the computation.

In an embodiment, the computed data representation of one or more data sets can be requested accessed by an entity, only if the data sets used to compute the data representation qualify as authorized data sets for the requesting entity. Stated differently, an entity may not access a previously-computed data representation, unless the entity can access the data sets used to compute the data representation.

For example, a DPMS stores multiple computing resource consumption-related data sets. The DPMS has used these data sets to create a statistical indicator that indicates the historical computing resource allocation given a particular type of application and particular number of users. To determine a proper resource allocation for an application, a client system of a cloud-provider requests the system to access the statistical indicator stored in the data pool. Based on the rule sets associated with multiple resource consumption-related data sets, the DPMS determines whether the data sets qualify as authorized data sets for the requesting entity. If so, only then the client system is authorized to request the use of the statistical indicator to calculate the proper resource allocation for the cloud-provider entity.

The request for the statistical indicator is usually utilized for, but not limited to, the selection of records in a query based method, ingestion into machine learning or AI based interpretation, and other processing operations like aggregation for reporting and data interpretation.

System Overview

FIG. 1 illustrates an example operating environment upon which an embodiment may be implemented. In FIG. 1, data pool management system (DPMS) 100 may comprise one or computer systems that are coupled using network 122 to one or more client systems 104-1, 104-N of entities that are the originators of a data set (originating entities) and/or are requestors (requesting entities) of operation(s) on data set(s) managed by DPMS 100. Any number of client systems 104-1, 104-N may be deployed in a distributed computing system of this type, as indicated by the designation "N" in 104-N. DPMS 100 and client systems 104-1, 104-N may be in two or more different locations such as different states, countries or other geographical or political units.

The DPMS 100 hosts, executes or comprises a server application 152, FTP server application 162, file system 174 and data pool 172. In an embodiment, server application 152 implements a client-server application in communication with compatible instances of a client application 108 that are hosted at the client systems 104-1, 104-N. The server application 152 may include presentation layer or graphical user interface (GUI) 158. The GUI 158 may be programmed to generate HTML documents, vector data, or other data that can be displayed or rendered at the client systems 104-1, 104-N to cause visually displaying data, images, text and the like representing prompts, GUI widgets, output data, reports and the like as part of the business application.

Network 122 broadly represents a digital data telecommunications network comprising any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

In an embodiment, client system 104-1 establishes a connection with DPMS 100 using one or more protocols to transmit one or more data sets for processing by DPMS 100. One technique to transmit a data set is for client system 104-1 to upload a file containing the data set to DPMS 100. For example, client system 104-1 may use client application 108 to transmit the file over FTP/SFTP protocol to FTP server application 162. Upon receipt of the file, FTP server application 162 may store the data set file for DPMS 100 to process the data set(s) of the file and store them in data pool 172.

In another embodiment, DPMS 100 may expose one or more of its directories coupled to data pool 172 through a network file system such as NFS/CIFS 174. Client system 104-1 may mount the network directory using client application 108 and transfer a data set file into the mounted directory. The transfer would trigger transmission of a copy of the data set file over network 122 to the mounted directory of DPMS 100. DPMS 100 processes data set(s) of the file and stores the data set(s) in data pool 172.

In yet another embodiment, client application 108 is a web browser which is used by a user of client computer system 104-1 to display graphical user interface 158 of server application 152 of DPMS 100. Through GUI 158, the user may select a file containing the data set to be uploaded to DPMS 100 and request server application 152 to initiate the transmission. The request triggers client application 108 to transmit the file using HTTP(s) (Hyper-Text Transfer Protocol) to server application 152. Upon the receipt, server application 152 may process and store data set(s) of the file in data pool 172.

In addition to the above embodiments, other data sharing techniques (e.g. content sharing platforms) may be used to transmit a data set from a client computer system and receive the data set at the DPMS 100.

Processing Data Set

In an embodiment, a DPMS uses one or more techniques described below to processes a received data set or a data set file before storing the data set in its data pool. DPMS may receive the native schema of a data set from an originating entity. The DPMS may use the schema to process the data set according to the native schema.

In one embodiment, a DPMS extracts and stores known data attributes and metadata attributes from data set(s) based on identifiers, originating entity-related attributes, and/or comparison with the broader data available in the data pool.

In an embodiment, a schema for a data set and/or for set of identifiers are specified in the data production/receipt process. A DPMS may perform validation of individual records of data set(s) associated with matched identifiers and their abstracted identities. With such a validation, the DPMS may apply a taxonomy of broader record definitions and additionally, may determine whether individual records are valid. The taxonomy may also be used by the DPMS for rule set applications using techniques described herein.

For example, one or more individual records may have a corresponding graph of identifiers, the graph representing an identity with which the records are associated. Each node in the graph may contain identifying information about the identity with which the records are associated. For example, in a travel-related data sets, a traveler may be represented by his/her hashed email address using any number of encryption techniques, social media (or other channel) user GUID(s) (Global Unique IDentfier), internet address of computer system(s) of the traveler or system identifiers of computer systems of the traveler, as well organizational specific offline identifiers (e.g. "frequent flyer number" and encrypted versions there of). During an example application of a rule set, a data set, or elements of its contained data and values, may qualify or disqualify for access based on the one or more nodes of one or more graph of identifiers. The rule set may include criteria that are based on identity(s) associated with the records that are part of the data set on which the operation is requested. For example, a rule set application may compare an identity of a requesting entity with the identities of the requested data set to determine whether any relationship exists.

Additionally, a DPMS performs routines to prune records of received data set(s) to eliminate duplication, to identify insufficient root data, and to associate rule set(s) being applied in a set of operations. The DPMS may perform operations on data set(s) to generate data representation(s) based on authorization techniques discussed herein.

Data Set Attributes

In an embodiment, a data set or a data set file received by a DPMS includes metadata with attributes describing originating entity. In another embodiment, the DPMS may extract one or more entity-related attributes from the metadata of the request received by the DPMS. Non-limiting examples of entity-related attributes includes attributes that describe originating entity's identifying information, industry, geographic areas of operations, and membership of industry organizations, alliances and standards of the originating entity.

In an embodiment, to determine entity-related attributes and to correlate records of different data set(s), a corpus is assigned to a defined taxonomy. The term "corpus" refers herein to a set of terms that are common in reference to an industry context, such as a cloud provider or an airline travel industry. The term "taxonomy" refers to assignments of a corpus to a business or industry vertical. The terms in a taxonomy are used in a defined set of use cases for a defined schema of attributes and records of data set(s). The assignment of a corpus to taxonomy may be accomplished using various techniques.

In an embodiment, a DPMS leverages a taxonomy for determining the association of data sets (and/or individual records of data set(s)) with rule sets and further, authorizing access to data set(s) or a data representation based on the relationship of a rule set, entity-related attribute(s) of an originating entity, a taxonomy and an entity-related attribute(s) of requesting entity.

As an example, for correlating same user account-related temporal records across multiple data sets in a data pool, definitions of a user account and of event attributes for which records were generated, are included in the taxonomy. Using the taxonomy, a DPMS may differentiate a particular multi-sourced construction of events and may determine a beginning and an end to the taxonomy-defined event entirely separate from event-related terms that may also be defined in the taxonomy.

In an embodiment, such a taxonomy along with the received data set(s) that include information on critical attributes describing user accounts and originating entity allows hierarchical rule-based access management of the data sets. For instance, based on rule-based access management, an access to an attribute of records describing an event may be disallowed, or access to all the records for an event may be disallowed, or correlating records of different events may be disallowed.

Within the construct of rule management, the attributes describing originating entities, events, user accounts, and other identifying information are also implemented in a rule set. Using these attributes, namespace-based correlation may be performed between data set(s) (and/or records of data set(s)) with originating entities. The namespace-based correlation causes rapid inclusion and exclusion of data set(s) in operations where rules are applied to allow and disallow sharing data representation(s) or data set(s) of a data pool.

In an embodiment, entity-related attributes are used to determine one or more rule sets associated with the data set. For example, an entity identifying information may be used to associate the data set with the rule-set(s) already pre-configured for the originating entity in the DPMS. As another example, an entity-related attribute describing a membership in an alliance may cause the alliance's group-level rule set to be associated with the data set.

Additional attributes may be included in the namespace-schema for creating a higher level correlated data set(s) from multi-sourced discrete records related to a particular user account, as an example. DPMS may utilize the namespace-based schema to similarly control access by a requesting entity to correlated data sets for modeling, aggregation and derivation and/or sharing the resulting data representations with a requesting entity. Indeed, the taxonomy for data set(s) received from originating entities are used to determine which rule set to apply for a request from a requesting entity and thus, whether an access is granted to the requesting entity.

Originating entity-related attribute(s) may represent the physical endpoint of the originating entity and/or the owner of the received data set(s). In an embodiment, endpoints and owners have a many-to-many relationship association because a single endpoint may represent many data owners, and a single data owner may have multiple endpoints for transmitting data to a DPMS. In another embodiment, the endpoint and the data owner are the same entity.

A membership may also be represented as an entity-related attribute of a data owner to indicate the membership of the data owner in one or more classes (e.g. vertical industry, or very specific associations entered into by a specific set of data owners). At the same time, a requesting entity may be associated attribute(s) that may directly limit its access in a data pool. Additionally or alternatively, the matching membership attributes of a requesting and originating entities may also affect the application of rule sets for a data set.

Determining Authorized Data for a Requesting Entity

In an embodiment, a DPMS receives a request from an entity (requesting entity) to perform operations on data set(s) of the data pool to yield one or more data pool representations. The term "data pool representation" refers herein to a data representation such as indicator(s) that are generated from data set(s) managed by a DPMS. Non-limiting examples of indicators include average, median, standard deviation, and other statistical aggregation or derivatives calculated or arrived at based on data values of data set(s), statistical models and algorithmic models and; Artificial Intelligence (AI) or machine learning.

For the data pool representations to be generated, the DPMS determines whether the data necessary for the data pool representation qualifies as authorized data for the requesting entity. The DPMS determines one or more data sets on which the requested operation may be performed. Based on one or more rule sets associated with the one or more data sets, the DPMS determines which one or more of the data sets (if any) qualify as authorized data set(s) for the requesting entity. The DPMS may perform the requested operation using data only from the authorized data set(s).

Figure 2:
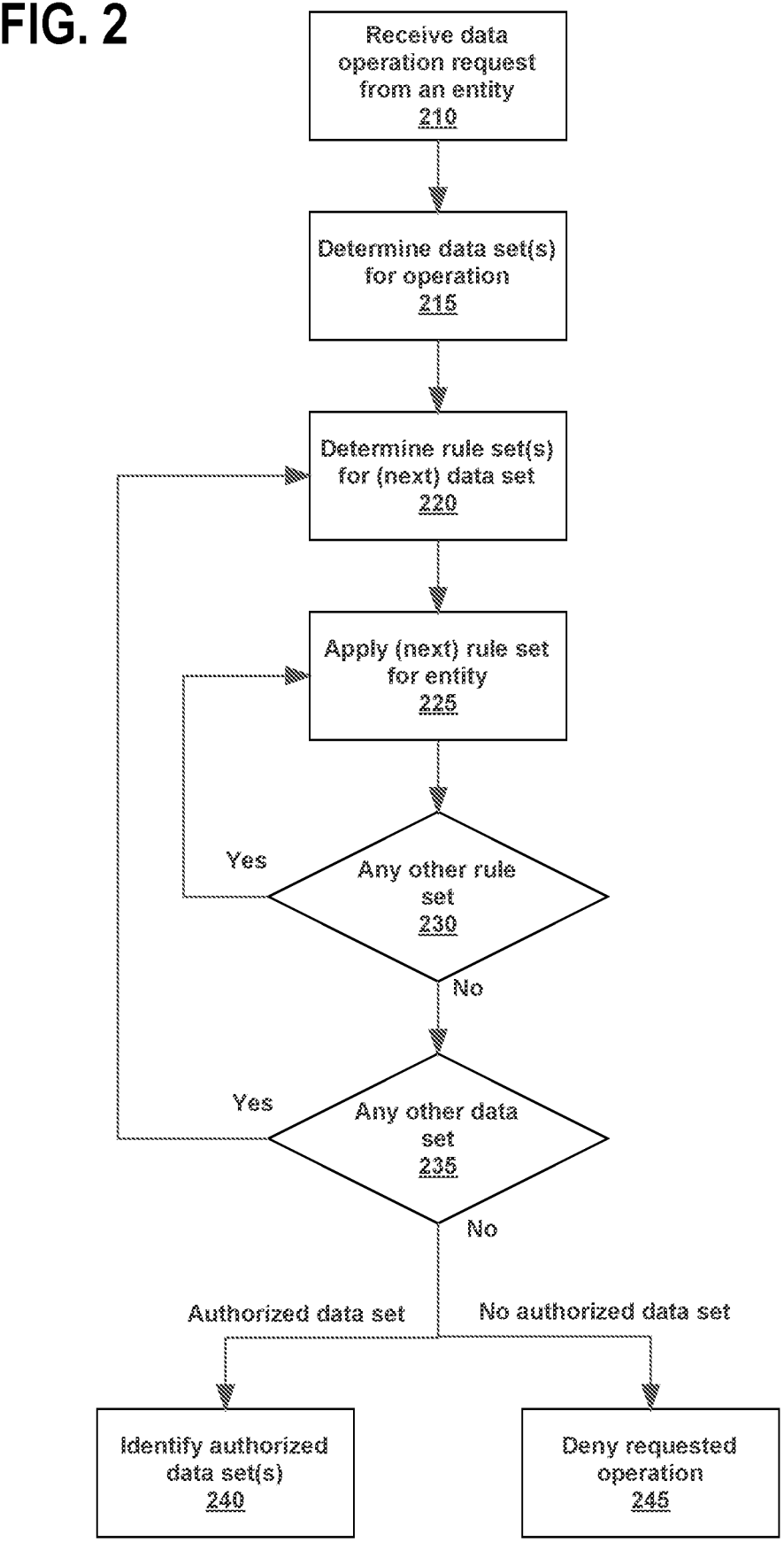
FIG. 2 is a flowchart that depicts a process for determining whether data set(s) qualify as authorized data set(s) for a requesting entity, in an embodiment.

FIG. 2 is a flowchart that depicts a process for determining whether data set(s) qualify as authorized data set(s) for a requesting entity, in an embodiment. At step 210, a DPMS receives a request for an operation on a data pool. In addition to the operation to be performed on data, the request may contain criteria for selection of data for the operation such as a type of data requested, the creation date-range of data and value-range for specific columns (or other data objects) of data. In an embodiment, data selection criteria is described in a form of a query statement such as an SQL statement or JSON matrix, while the operation includes a request to execute the content of the statement.

As a non-limiting example of a request, a DPMS may receive a query for a CPU utilizations for the past month for computers system that have a particular speed CPU. The operation may additionally request a calculation of the median of the selected CPU utilizations.

At step 215, the DPMS determines which data set(s) of its data pool contain data for the requested operation. In an embodiment in which a query is specified in the request, the DPMS may process the query against the data pool to identify the possible data sets for the requested data. In other embodiments, the DPMS is pre-configured to associate the request to one or more data sets in the data pool that contain the requested data. Accordingly, continuing with the above example, the DPMS can process the query against the data sets of data pool to identify which data sets contain CPU utilizations data, time stamp of such data and CPU speed attribute data. Once the DPMS identifies the data set, the DPMS may perform an authorization check for the requesting entity for the identified data sets.

At steps 220 through 235, the DPMS iterates through the identified one or more data sets and applies the respective one or more rule set(s) associated with each of the identified data sets. At step 220, the DPMS iterates through the data sets identified at step 215. At step 225, the DPMS determines one or more rule sets associated with the data set selected at step 220 and applies each rule set for the selected data set. Accordingly, at steps 225-230, each rule set of the one or more rule sets of a selected data set is applied, and the application of the rule sets resolves whether the selected data set qualifies as an authorized data set for the requesting entity.

In an embodiment, in which multiple rule sets are associated with a selected data set, if at least one rule set qualifies the data set as authorized data set for the requesting entity, then the data set is authorized to be used for the requested operation. In another embodiment, if at least one rule set disqualifies the data set as an authorized data set for the requesting entity, then the data set cannot be used for the requested operation by requested entity.

The rule sets associated with the selected data set may also be preconfigured according to a hierarchy. In such an embodiment, a rule set may be selected at step 225 based on the hierarchy. In one embodiment, a disqualification or qualification based on a lower-tiered rule set overrides an application of a higher-tiered rule set. In such an embodiment, the lower-tiered rule set may be applied first. In another embodiment, a disqualification or qualification based on a higher-tiered rule set overrides a lower-tiered rule set for a data set. In such an embodiment, the higher-tiered rule set may be applied first. In either of the hierarchy-based rule set applications, if a rule set neither qualifies nor disqualifies a data set, the next rule set in the hierarchy is used to make the determination on the qualification of the data set as an authorized data set for the requesting entity.

In case that none of the rule set(s) neither qualify, nor disqualify the data set, then a preconfigured default rule setting may be used to make the determination on the qualification. For example, the default rule setting may be to qualify a data set as authorized data set, if all the associated rule set(s) neither qualified, nor disqualified the data set as such.

Rule set resolution to qualify or disqualify a data set may be based on comparing the content of the rule set with the data of the request. In an embodiment, a rule set describes criteria that an entity associated with the request has to meet in order to be qualified or disqualified from using the associated data set. Criteria of rule set may describe the verticals of industry that a requesting entity has to be part of, a geography in which a requesting entity has to operate, an organization of which a requesting entity has to be a member, and/or a list of entities of which a requesting entity has to be part of.

Additionally or alternatively, criteria of a rule set may specify authorized or unauthorized operation types on associated data set(s) of the rule set. Criteria may explicitly permit a requested operation on associated data set(s) if the requested operation matches the authorized operation type or at least fails to match any of the specified unauthorized operation. Otherwise, the application of the rule set with such criteria may fail to qualify the associated data set(s) as authorized for the requesting entity.

Continuing with the above example of the median CPU utilization request, the request may be received from a client computer system associated with cloud provider company A. The DPMS determines that three different data sets A-C contain the requested information in the data pool. Data sets A-C originated from cloud provider companies A and B and a computer manufacturer C, respectively. Data set A has an associated rule set on the entity-level which grants the originating entity A full access to data set A and denies all other entities access to data set A.

Data set B has no associated entity-level rule set but is associated with a group level rule set. In fact, both entities A and B are member of an industry organization that has an associated group configured with the DPMS that represents the industry organization. The group-level rule set of the group is associated with data set B and authorizes the associated data sets for entity members of the group.

On the other hand, data set C has an operation-based rule set that disqualifies the data set for a statistical indicator-based operation(s), in this example. All data sets have a system-level rule set that specifies that any data set that is not explicitly disqualified by a lower-tier rule set is qualified as an authorized data set, if the originating entity and the requesting entity are not in the same verticals of industry.

According to the rule sets of this example, for requesting entity A, data set A is qualified as an authorized data set because the entity-level rule set's criteria specifically authorizes entity A. Data set B's entity-level rule set does not explicitly qualify data set B for requesting entity A as an authorized data set. However, the group-level rule set associated with data set B qualifies data set B an authorized data set because entities A and B are co-members of an industry organization. At the same time, applying the system lever rule-set of this example disqualifies data set B because entities A and B are in the same industry vertical (cloud-providers). Because the system-level rule set is a higher-tier rule set than the group-level rule-set, the DPMS may be pre-configured not apply the system level rule-set once the group-level rule set(s) qualified data set B. Alternatively, the DPMS may simply disregard the result of the application for the same reason.

Since the requested operation by entity A is a query-based median operation rather than a training the training type operation, the entity level rule set fails to disqualify data set C. Instead, the system-level rule set authorizes data set C to be used in a requested operation because requesting entity A and originating entity C are in different verticals, cloud-provider and computer manufacturer, respectively, In one embodiment, the system determines based on one rule set, that a data set does not qualify as an authorized data set for the operation. At the same time, based on another rule set of the same level, the DPMS determines that the same data set does qualify as an authorized data set for the entity. If no other tier rule set exists for the data set, according to one approach, the DPMS determines that the authorizing rule set overrules the non-authorizing rule set, and may proceed to fulfilling the request for performing the operation using the data set. According to another approach, the DPMS determines that the non-authorizing rule set overrules the authorizing rule set and exclude the data set from being used in the requested operation.

In another embodiment, the system may determine the authorized data based on designated access of a system-level rule set without applying any other rule set. The system determines whether any system-level rule set is associated with a requesting entity. If a system-level rule set is associated with the requesting entity and designates access to the requesting entity for one or more data sets, then the data sets are qualified as authorized data for the requesting entity without applying any other rule set including those associated with the data sets. Similarly, if the associated system-level rule set designates the requesting entity and denies access to the requesting entity, then the requesting entity is denied access without applying any other rule set.

As another example, requesting entity D may request operations on data sets A-C. The DPMS may determine that the requesting entity D has an associated system-level rule set, which has designated requesting entity D to have authorization to access data set A-C. Because requesting entity D has the associated system-level rule set designating requesting entity D for access, data sets A-C are qualified as authorized data sets without applying any other rule set, such as those associated with data sets A-C.

Continuing with FIG. 2, the authorized data sets for the requested operation are identified at step 240. If no authorized data set has been identified for the request, the requested operation is denied at step 245.

Performing Operations on Authorized Data Sets

With authorized data sets determined, the DPMS may proceed to fulfilling the request for an entity by performing the requested operation. In one embodiment, the requested operation is to compute an indicator of selected data from authorized data set(s). The DPMS may proceed with the request by executing the operation and thereby generating one or more indicators. The indicators may be returned to the requesting entity as part of a response to the request.

To significantly improve consumption of computing resources for servicing a request for a data pool representation, a DPMS stores indicators that have been previously computed by the DPMS in association with the data set(s)

used in the computation(s). Thus, when a request for a data pool representation is received, and the data pool representation as well as the authorized data sets for the request match an already stored data pool representation, then the stored data pool representation is used without computing a new data pool representation for the request. Accordingly, the computing resources as well as latency for computing the new data pool representation may be completely avoided, significantly improving the performance of the DPMS.

Moreover, a data pool representation calculated for one entity's request is used by another entity avoiding the re-calculation, in an embodiment. In such an embodiment, a DPMS provides significant improvement by pooling computing resources for entities in addition to pooling data because computing resources spent on calculation for one entity also benefit another entity.

Figure 3:
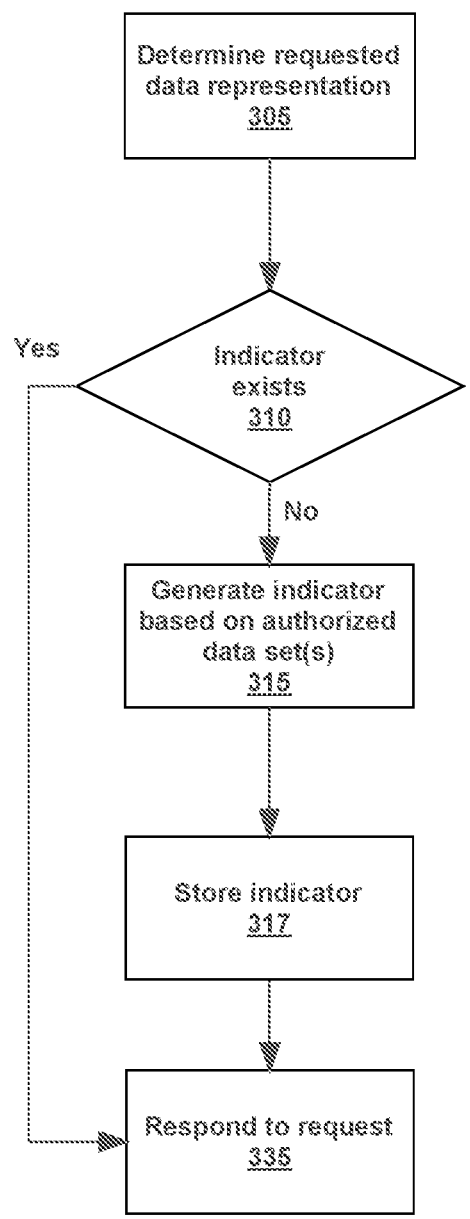
FIG. 3 is a flow chart that depicts a process for generating a response to a request for an operation on a data pool, in an embodiment.

FIG. 3 is a flow chart that depicts a process for generating a response to a request for an operation on a data pool, in an embodiment. At step 305, a DPMS determines from the request the data pool representation requested by an entity. If the requested data pool representation is an indicator, then the process moves to step 310.

At step 310, the DPMS determines whether the indicator requested has been previously calculated. In an embodiment, the DPMS determines authorized data sets using techniques described above and determines whether the requested indicator exists for the authorized data sets at step 310. At step 315, if the indicator has not been previously calculated and stored for a later user, the DPMS generates the requested indicator using the authorized data sets. To do so, the DPMS performs the requested operation(s) on data selected from the authorized data set based on the request. At step 317, the generated indicator is stored within the DPMS for future use. At step 335, the DPMS responds to the request by returning the generated indicator.

At step 335, the DPMS responds with a pre-computed indicator, if the DPMS identifies the pre-computed indicator that matches the request from the entity.

For example, continuing with the example of the request for a median of the CPU utilizations for the past month for computers system that have a particular speed CPU, the DPMS has determined that data sets A-C qualify as authorized for the requested operation (as discussed in the previous example). If the DPMS identifies that data sets A-C have associated median CPU utilization that matches the request, then the DPMS returns the stored median CPU utilization in response to the request.

On the other hand, if the DPMS fails to identify any CPU utilization median that matches the request, then authorized data sets A-C are used to query for CPU utilization data. The DPMS retrieves the CPU utilization data of the past months for the computer systems with the particular speed CPU from data sets A-C and computes the median based on the CPU utilization data. The DPMS returns the newly computed median as a response to the request from entity A.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
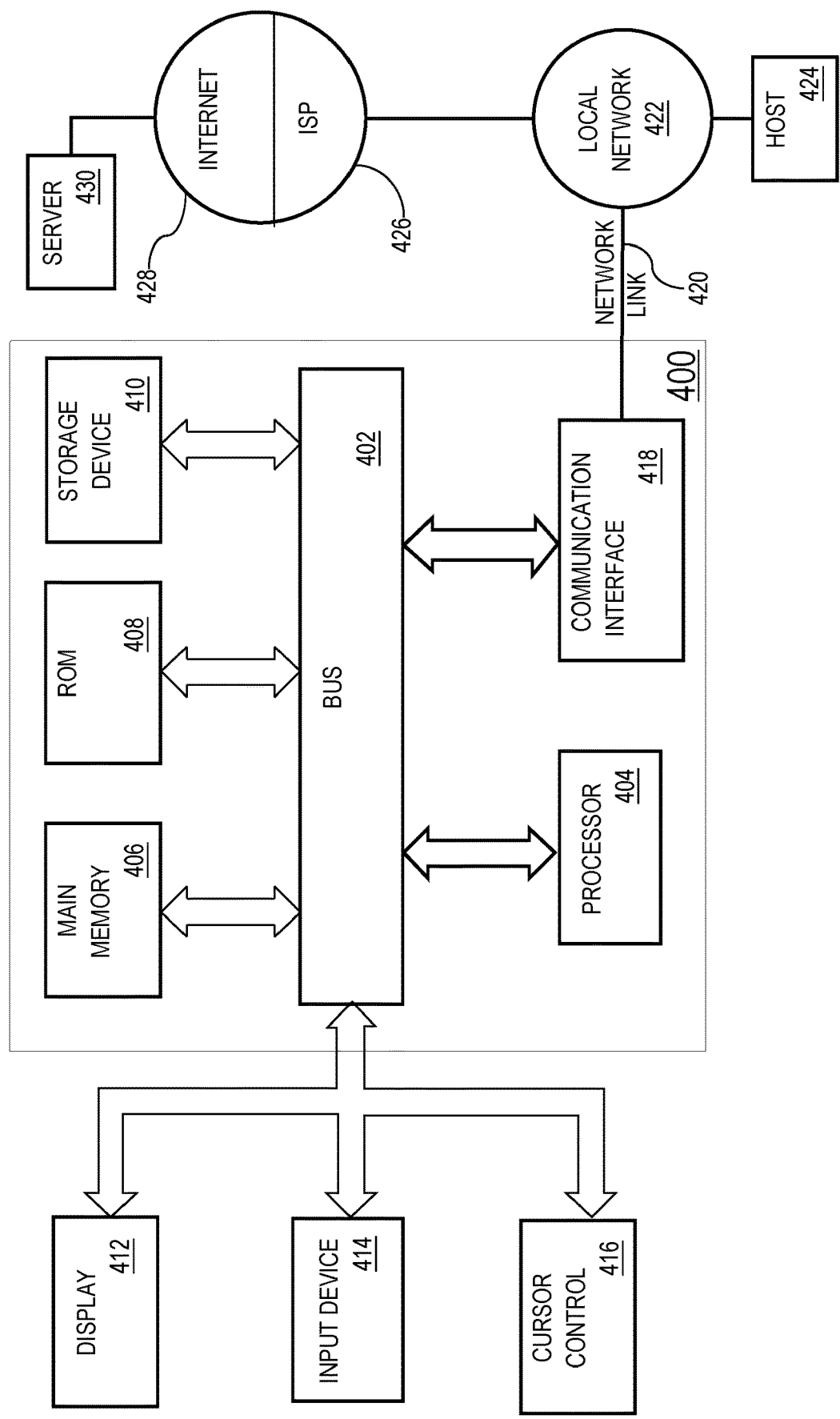
FIG. 4 is a block diagram that illustrates a computer system 400 upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software System Overview

Figure 5:
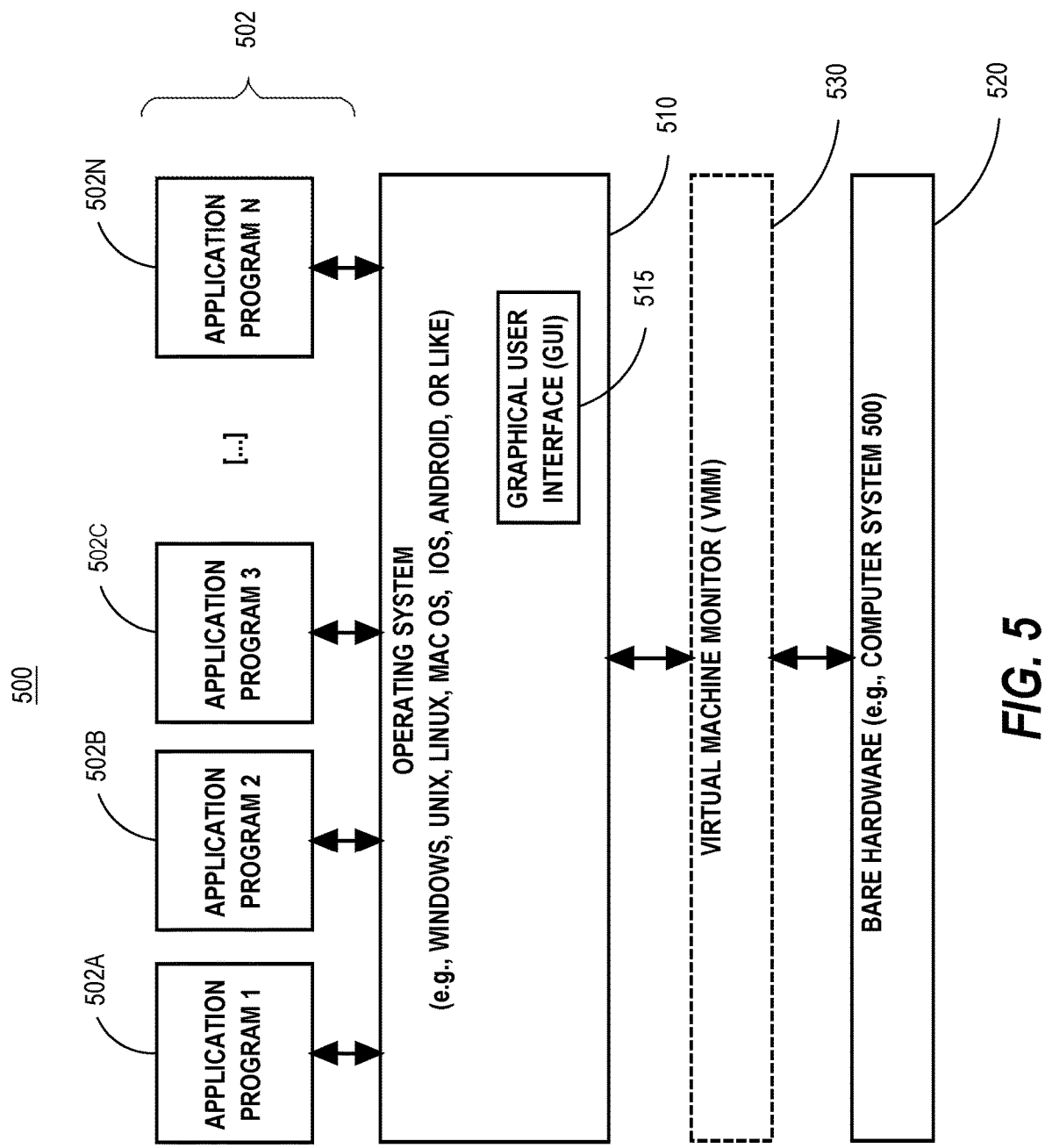
FIG. 5 is a block diagram of a basic software system, in one or more embodiments.

FIG. 5 is a block diagram of a basic software system 500 that may be employed for controlling the operation of computing system 400 of FIG. 4. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A computer-implemented method comprising:
    storing a plurality of data sets, wherein each data set of the plurality of data sets originates from a respective entity of a plurality of entities;
    for each particular data set of the plurality of data sets, maintaining a rule set that governs access to the data set, wherein the rule set includes at least one criterion that must be satisfied by a requesting entity in order to access the particular data set, wherein the at least one criterion includes at least one of membership in an industry association or industry group of entities requesting access to the data set, geography of entities requesting access to the data set, or an industry of entities requesting access to the data set;
    receiving, from a requesting entity, a request to perform an operation using the plurality of data sets;
    determining authorized data sets from the plurality of data sets upon which the requesting entity is authorized to perform the requested operation, wherein the authorized data sets include data sets where the requesting entity satisfies the at least one criterion included in the rule set for each data set; and
    in response to determining the authorized data sets, performing the requested operation using only the authorized data sets.

2. The computer-implemented method of claim 1, wherein the request is a first request, the requesting entity is a first requesting entity, and the authorized data sets are first authorized data sets, the method further comprising:
receiving, from a second requesting entity, a second request to perform an operation using the plurality of data sets;
determining second authorized data sets from the plurality of data sets upon which the second requesting entity is authorized to perform the requested operation, wherein the second authorized data sets include data sets where the second requesting entity satisfies the at least one criterion included in the rule set for each data set, and wherein the second authorized data sets are different than the first authorized data sets; and
in response to determining the second authorized data sets, performing the requested operation using only the second authorized data sets.

3. The computer-implemented method of claim 2 further comprising:
receiving, from a third requesting entity, a third request to perform an operation using the plurality of data sets;
determining that the third requesting entity is not authorized to perform the requested operation on any data set from the plurality of data sets, wherein the third requesting entity does not satisfy the at least one criterion included in the rule set for any of the plurality of data sets; and
in response, rejecting the third request without performing the requested operation.

4. The computer-implemented method of claim 1, wherein the rule set for each data set includes a plurality of tiered rule sets each associated with a particular tier, and wherein a particular requesting entity that does not satisfy the at least criterion for a first tiered rule set is authorized to access the associated data set if it satisfies the at least criterion for a second tiered rule set associated with a higher tier than the first tiered rule set.

5. The computer-implemented method of claim 4, wherein the plurality of tiered rule sets include a system-level rule set, a group-level rule set, and an entity-level rule set.

6. The computer-implemented method of claim 5, wherein the system-level rule set is associated with a higher tier than the group-level rule set, and the group-level rule set is associated with a higher tier than the entity-level rule set.

7. The computer-implemented method of claim 1, further comprising:
after performing the requested operation, storing a data representation of the operation;
after storing the data representation, receiving a subsequent request to perform the operation using the plurality of data sets from a different requesting entity, wherein the different requesting entity is authorized to perform the operation on the authorized data sets;
in response, providing the stored data representation to the different requesting without performing the requested operation.

8. A system comprising:
a computer system including at least one processor and a memory, and configured to perform operations including:
storing a plurality of data sets, wherein each data set of the plurality of data sets originates from a respective entity of a plurality of entities;
for each particular data set of the plurality of data sets, maintaining a rule set that governs access to the data set, wherein the rule set includes at least one criterion that must be satisfied by a requesting entity in order to access the particular data set, wherein the at least one criterion includes at least one of membership in an industry association or industry group of entities requesting access to the data set, geography of entities requesting access to the data set, or an industry of entities requesting access to the data set;
receiving, from a requesting entity, a request to perform an operation using the plurality of data sets;
determining authorized data sets from the plurality of data sets upon which the requesting entity is authorized to perform the requested operation, wherein the authorized data sets include data sets where the requesting entity satisfies the at least one criterion included in the rule set for each data set; and
in response to determining the authorized data sets, performing the requested operation using only the authorized data sets.

9. The system of claim 8, wherein the request is a first request, the requesting entity is a first requesting entity, and the authorized data sets are first authorized data sets, the operations further comprising:
receiving, from a second requesting entity, a second request to perform an operation using the plurality of data sets;
determining second authorized data sets from the plurality of data sets upon which the second requesting entity is authorized to perform the requested operation, wherein the second authorized data sets include data sets where the second requesting entity satisfies the at least one criterion included in the rule set for each data set, and wherein the second authorized data sets are different than the first authorized data sets; and
in response to determining the second authorized data sets, performing the requested operation using only the second authorized data sets.

10. The system of claim 9, the operations further comprising:
receiving, from a third requesting entity, a third request to perform an operation using the plurality of data sets;
determining that the third requesting entity is not authorized to perform the requested operation on any data set from the plurality of data sets, wherein the third requesting entity does not satisfy the at least one criterion included in the rule set for any of the plurality of data sets; and
in response, rejecting the third request without performing the requested operation.

11. The system of claim 8, wherein the rule set for each data set includes a plurality of tiered rule sets each associated with a particular tier, and wherein a particular requesting entity that does not satisfy the at least criterion for a first tiered rule set is authorized to access the associated data set if it satisfies the at least criterion for a second tiered rule set associated with a higher tier than the first tiered rule set.

12. The system of claim 11, wherein the plurality of tiered rule sets include a system-level rule set, a group-level rule set, and an entity-level rule set.

13. The system of claim 12, wherein the system-level rule set is associated with a higher tier than the group-level rule set, and the group-level rule set is associated with a higher tier than the entity-level rule set.

14. The system of claim 8, the operations further comprising:
after performing the requested operation, storing a data representation of the operation;

after storing the data representation, receiving a subsequent request to perform the operation using the plurality of data sets from a different requesting entity, wherein the different requesting entity is authorized to perform the operation on the authorized data sets;

in response, providing the stored data representation to the different requesting without performing the requested operation.

15. An article of manufacture comprising a non-transitory, computer-readable medium having computer-executable instructions thereon that are executable by a processor of a computer system to perform operations comprising:

storing a plurality of data sets, wherein each data set of the plurality of data sets originates from a respective entity of a plurality of entities;

for each particular data set of the plurality of data sets, maintaining a rule set that governs access to the data set, wherein the rule set includes at least one criterion that must be satisfied by a requesting entity in order to access the particular data set, wherein the at least one criterion includes at least one of membership in an industry association or industry group of entities requesting access to the data set, geography of entities requesting access to the data set, or an industry of entities requesting access to the data set;

receiving, from a requesting entity, a request to perform an operation using the plurality of data sets;

determining authorized data sets from the plurality of data sets upon which the requesting entity is authorized to perform the requested operation, wherein the authorized data sets include data sets where the requesting entity satisfies the at least one criterion included in the rule set for each data set; and in response to determining the authorized data sets, performing the requested operation using only the authorized data sets.

16. The article of claim 15, wherein the request is a first request, the requesting entity is a first requesting entity, and the authorized data sets are first authorized data sets, the operations further comprising:

receiving, from a second requesting entity, a second request to perform an operation using the plurality of data sets;

determining second authorized data sets from the plurality of data sets upon which the second requesting entity is authorized to perform the requested operation, wherein the second authorized data sets include data sets where the second requesting entity satisfies the at least one criterion included in the rule set for each data set, and wherein the second authorized data sets are different than the first authorized data sets; and in response to determining the second authorized data sets, performing the requested operation using only the second authorized data sets.

17. The article of claim 16, the operations further comprising:

receiving, from a third requesting entity, a third request to perform an operation using the plurality of data sets;

determining that the third requesting entity is not authorized to perform the requested operation on any data set from the plurality of data sets, wherein the third requesting entity does not satisfy the at least one criterion included in the rule set for any of the plurality of data sets; and in response, rejecting the third request without performing the requested operation.

18. The article of claim 15, wherein the rule set for each data set includes a plurality of tiered rule sets each associated with a particular tier, and wherein a particular requesting entity that does not satisfy the at least criterion for a first tiered rule set is authorized to access the associated data set if it satisfies the at least criterion for a second tiered rule set associated with a higher tier than the first tiered rule set.

19. The article of claim 18, wherein the plurality of tiered rule sets include a system-level rule set, a group-level rule set, and an entity-level rule set.

20. The article of claim 19, wherein the system-level rule set is associated with a higher tier than the group-level rule set, and the group-level rule set is associated with a higher tier than the entity-level rule set.

* * * * *